United States Patent [19]

Kuroda

[11] Patent Number: 5,038,156
[45] Date of Patent: Aug. 6, 1991

[54] LIGHT BEAM SCANNING OPTICAL SYSTEM

[75] Inventor: Muneo Kuroda, Osaka, Japan

[73] Assignee: Minolta Camera Kabushiki Kaisha, Osaka, Japan

[21] Appl. No.: 306,472

[22] Filed: Feb. 3, 1989

[30] Foreign Application Priority Data

Feb. 4, 1988 [JP] Japan ................................. 63-25409
Feb. 4, 1988 [JP] Japan ................................. 63-25410

[51] Int. Cl.$^5$ ............................................. G01D 9/42
[52] U.S. Cl. ...................................... 346/108; 346/160
[58] Field of Search ................ 346/108, 107 R, 76 L, 346/160; 350/6.5, 6.7, 6.8

[56] References Cited

U.S. PATENT DOCUMENTS

| | | |
|---|---|---|
| 3,469,030 | 9/1969 | Priebe . |
| 4,520,370 | 5/1985 | Fujii ................................. 346/108 |
| 4,704,698 | 11/1987 | Reiniger ............................. 346/108 |

FOREIGN PATENT DOCUMENTS

| | | |
|---|---|---|
| 3644124 | 7/1988 | Fed. Rep. of Germany . |
| 54-12304 | 9/1979 | Japan . |
| 55-36127 | 9/1980 | Japan . |
| 61-173212 | 8/1986 | Japan . |

*Primary Examiner*—Mark J. Reinhart
*Attorney, Agent, or Firm*—Price, Gess & Ubell

[57] ABSTRACT

A deflection device and a spherical mirror for use in a light beam scanning optical system which fulfills either one of the following equations, $$0.15 < (d/|R_M|) < 0.45 \qquad (1)$$

wherein d is a distance from a point of reflection of luminous flux directed toward the center of a scanning direction by a deflection device to the vertex of a spherical mirror, and $R_M$ is a radius of curvature or, $$(|s/R_M|) > 0.6$$
$$0.2 < (d/|R_M|) < 0.6$$

wherein s is a distance from a point of reflection of luminous flux directed toward the center of scanning direction by a deflection device to light collecting point after reflection of deflection device. When the spherical mirror fulfills the equation (1), it collects a parallel luminous flux deflected by the deflection device onto the surface of photodetector, while when the equation (2) is fulfilled, the spherical mirror receives a converged luminous flux deflected by the deflection device and collects it onto the surface of photoconductor.

7 Claims, 5 Drawing Sheets

(EXPERIMENTAL EXAMPLE I)

(EXPERIMENTAL EXAMPLE I)

(EXPERIMENTAL EXAMPLE II)

(EXPERIMENTAL EXAMPLE II)

(EXPERIMENTAL EXAMPLE III)

(EXPERIMENTAL EXAMPLE III)

(EXPERIMENTAL EXAMPLE IV)

(EXPERIMENTAL EXAMPLE IV)

(EXPERIMENTAL EXAMPLE V)

(EXPERIMENTAL EXAMPLE V)

(EXPERIMENTAL EXAMPLE VI)

(EXPERIMENTAL EXAMPLE VI)

(EXPERIMENTAL EXAMPLE VII)

(EXPERIMENTAL EXAMPLE VII)

LIGHT BEAM SCANNING OPTICAL SYSTEM

BACKGROUND OF THE INVENTION

1. Technical Field of the Invention

The present invention relates to a light beam scanning optical system, and more particularly to a mechanism of a light beam scanning optical system incorporated in laser beam printers, facsimile and the like for deflectively collecting and scanning on a photoconductor a luminous flux which is provided with image information.

2. Brief Description of Related Art

Generally, the light beam scanning optical system utilized in laser beam printers and facsimilies basically comprises a semiconductor laser as a light source, a deflecting means such as a polygon mirror and a galvano mirror, and an f$\theta$ lens. The deflecting means is utilized for scanning a luminous flux emitted from the semiconductor laser at an equiangular velocity, however, a homogeneous image can not be obtained since there occurs a difference in scanning speed over the range from a central portion to both edges in the main scanning direction at light collecting plane. An f$\theta$ lens is therefore provided for rectifying the difference in the scanning speed.

The f$\theta$ lens is made by combining various concave lenses, convex lenses and the like, and lens planning is extremely complicated. Because of a number of planes to be ground, it is quite hard to improve accuracy in manufacturing process and the cost is quite expensive. Moreover, there is limitation in selecting a material which possesses good permeability.

Accordingly, in place of the f$\theta$ lens, the use of an elliptical mirror (Japanese Published Unexamined Patent Application No. 123040/1979), the use of a parabolic mirror (Japanese Published Examined Patent Application No. 36127/1980) and the use of a concave reflector (Japanese Published Unexamined Patent Application No. 173212/1986) have hitherto been proposed. However, there are difficulties in manufacturing the elliptical mirror and parabolic mirror with further difficulty in obtaining high manufacturing accuracy.

When the concave reflector is used, it is necessary to prepare the same length of a concave reflector as that of a main scanning direction since the reflected light is being collected in the direction perpendicular to the surface of a photoconductor, thereby causing the optical system itself to become impracticably large in size.

SUMMARY OF THE INVENTION

The main object of the present invention is to provide an inexpensive and compact light beam scanning optical system by adopting a scanning speed correcting means which can be readily manufactured and is capable of improving the manufacturing accuracy in place of the expensive and limited availability of the f$\theta$ lens, parabolic mirror and the like which have been previously proposed.

Another object of the present invention is to provide a light beam scanning optical system capable of lowering manufacturing cost and accomplishing the manufacture of compact size optical system by merely setting a special curvature of a spherical mirror and a positional relationship between a deflection device and the spherical mirror with the adoption of a very simple optical system which is designed to direct a light beam from a deflection device onto a photoconductor by the spherical mirror.

A further object of the present invention is to provide a light beam scanning optical system capable of lowering manufacturing cost and making the system compact in size with further improvement of the level of an image plane by adopting a scanning speed correcting means which can be readily manufactured and capable of improving the manufacturing accuracy in place of the expensive and limited availability of an f$\theta$ lens, a parabolic mirror and the like which have hitherto been proposed.

Still another object of the present invention is to provide a light beam scanning optical system capable of lowering manufacturing cost and accomplishing the manufacture of a compact size optical system with further improvement on the level of image plane by merely setting a special curvature of a spherical mirror and a mutual positional relationship among a deflection device, a spherical mirror and a photoconductor with adoption of a simple optical system wherein optical members are used to make the light beam directed to the deflection device a converged luminous flux in addition to an optical system designed to collect a light beam from the deflection device onto the photoconductor by the spherical mirror.

These and other objects and features of the present invention will become more apparent from the following description taken in conjunction with the preferred embodiments thereof with reference to the accompanying drawings.

BRIEF DESCRIPTION OF THE DRAWINGS

FIGS. 1 through 5 show a first embodiment of the present invention which is applied to a laser beam printer, wherein FIG. 1 is a perspective view showing a schematic construction.

FIG. 2 is a diagram schematically explaining a light path.

FIGS. 3a through 5b are graphs showing aberrations on the light collecting surface, wherein the vertical axis shows angle of deflection and the horizontal axis shows degree of distortion in the (a), and in the (b), the vertical axis shows angle of deflection and the horizontal axis shows degree of curvature.

FIGS. 7 through 11 illustrates a third embodiment of the present invention, wherein FIG. 7 is a perspective view showing a schematic construction.

FIGS. 8a through 11b are graphs showing aberrations on the light collecting surface, wherein the horizontal vertical axis shows angle of deflection and the vertical axis shows degree of distortion in the (a), and in the (b), the horizontal axis shows angle of deflection and the vertical axis shows a degree of curvature.

It is to be noted that like members are designated by like reference numerals and repeated descriptions are omitted.

DESCRIPTION OF PREFERRED EMBODIMENT

Some of the embodiments of the present invention will now be described with reference to accompanying drawings.

Figure 1:
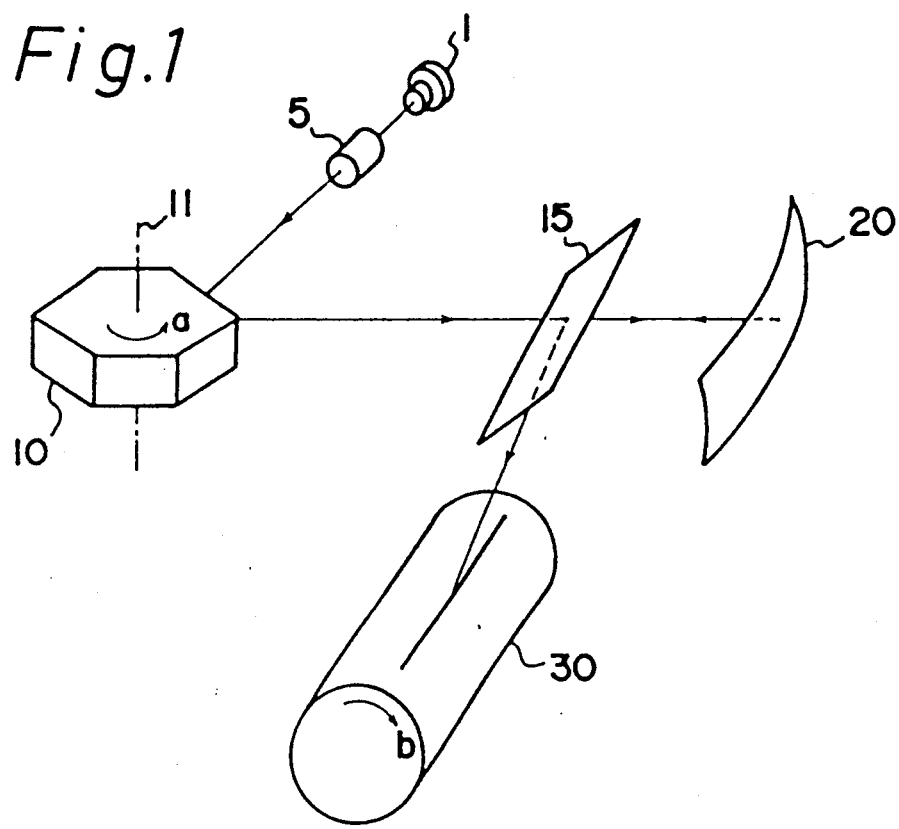

FIG. 1 shows a schematic construction of a first embodiment of the present invention which is applied to a laser beam printer.

In FIG. 1, the numeral 1 designates a semiconductor laser. The semiconductor laser 1 is intensity modulated by an unillustrated control circuit and radiates an emitting luminous flux which is provided with image information. The emitted luminous flux is corrected to almost a parallel luminous flux by passing through a collimator lens 5 and enters a polygon mirror 10.

The polygon mirror 10 is rotatively driven by an unillustrated motor at a constant speed in the direction of an arrow a centering on a shaft 11. The parallel luminous flux passed through the collimator lens 5 is thus successively reflected on each facet of the polygon mirror 10 and is deflected at an equiangular velocity. After permeating through a beam splitting device 15, the luminous flux is reflected on the side of a concave surface of a spherical mirror 20 and is further reflected by the beam splitting device 15 and then collected onto a drum photoconductor 30. At this stage, the collected luminous flux is scanned at a uniform velocity in the axial direction of the photoconductor 30 which is called main scanning. While, the photoconductor 30 is rotatively driven at a constant speed in the direction of arrow b and the scanning by this rotation is called sub-scanning.

Figure 2:
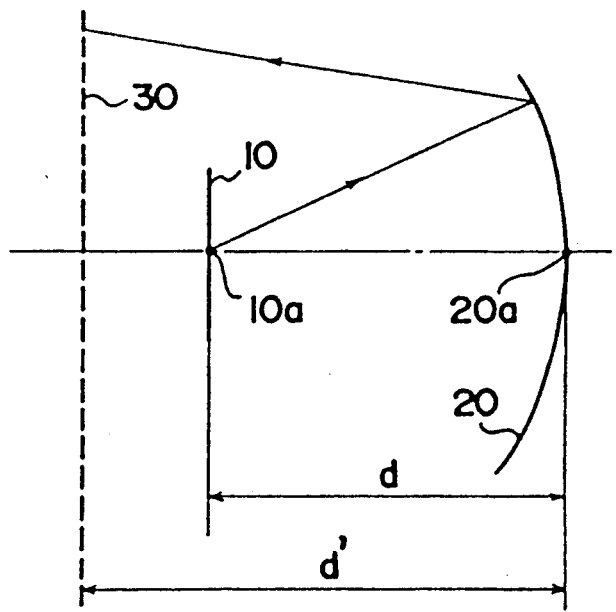

In the above-mentioned light beam scanning optical system, an image (an electrostatic latent image) is formed on the photoconductor 30 by the intensity modulation of the semiconductor laser 1 with the main and sub-scanning. As shown in FIG. 2, in place of the conventional $f\theta$ lens, the spherical mirror 20 rectifies the scanning speed in the main scanning direction to be uniform over the range from the center to both edges of the scanning area.

As illustrated in FIG. 2, the relationship between the distance d from a reflection point of luminous flux (hereinafter called point of deflection)10a directed toward the center of scanning area by the polygon mirror 10 to the vertex (20a) of the spherical mirror 20 and the radius of curvature ($R_M$) of the spherical mirror is set to fulfill the following equation.

$$0.15 < (d/|R_M|) < 0.45 \quad (1)$$

In FIG. 2, d' represents a distance from the vertex of the spherical lens 20 to the photoconductor 30.

The minimum and maximum values in the equation (1) are set within an experientially permissible range of image distortion on the photoconductor 30.

If the value exceeds the minimum limit, positive distortion is increased according to the increment of the angle of deflection to result in the elongation of image at both edges in the main scanning direction (in the neighborhood of scan starting and scan ending positions).

If the value exceeds the maximum limit, negative distortion is increased according to the increment of the angle of deflection to result in the shrinkage of the image at both edges in the main scanning direction.

The constructional data in the experimental examples I, II and III of the present embodiment will now be shown below, wherein the diameter of an inscribed circle of the polygon mirror 10 is set at 23.5 mm.

|  | Experimental Example | | |
| --- | --- | --- | --- |
|  | I | II | III |
| Radius of Curvature of Spherical Mirror ($R_M$) mm | −200 | −200 | −200 |
| Distance (d) mm from Point of Deflection to Spherical Mirror | 45 | 35 | 85 |
| Distance (d') mm from Spherical Mirror to Photoconductor | 100 | 100 | 100 |
| $d / |R_M|$ | 0.225 | 0.175 | 0.425 |

Figure 3A:
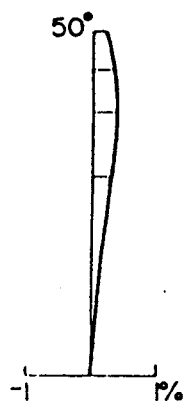
Figure 3B:
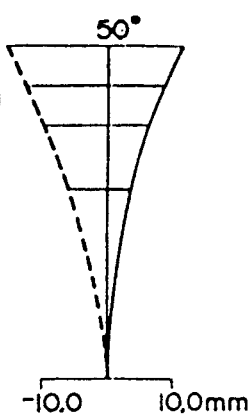
Figure 4A:
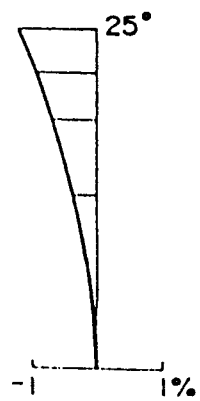
Figure 4B:
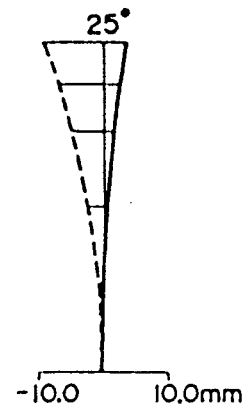
Figure 5A:
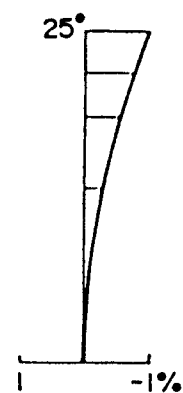
Figure 5B:
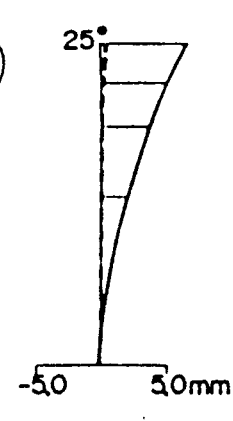

The aberrations at the light collecting surface of the photoconductor in the above experimental examples I, II and III are shown in FIGS. 3, 4 and 5. In the figures of (a), angle of deflection is shown by vertical axis and degree of distortion by horizontal axis, while in the figures of (b), angle of deflection is shown by vertical axis and degree of curvature by horizontal axis. A dotted line shows a curvature of the field by a luminous flux in the deflected surface and a solid line shows a curvature of the field by a luminous flux in the vertical surface against the deflected surface.

Practically, by providing a spherical mirror in the light path extending from a deflection device to the surface of the photoconductor in such a manner as to fulfill the above equation (1), the scanning speed in the main scanning direction can be uniformly rectified. Besides, the spherical mirror is readily manufactured as compared with the conventional $f\theta$ lens with much improvement in the manufacturing accuracy, and the material can be widely selected since it need not be transparent. Thus, it can be utilized as an inexpensive and highly efficient scanning optical system. The light path is turned over by the spherical mirror itself and the whole optical system becomes compact in size. Compared with the parabolic mirror and elliptical mirror, it can be advantageously manufactured with much improved manufacturing accuracy.

Figure 6:
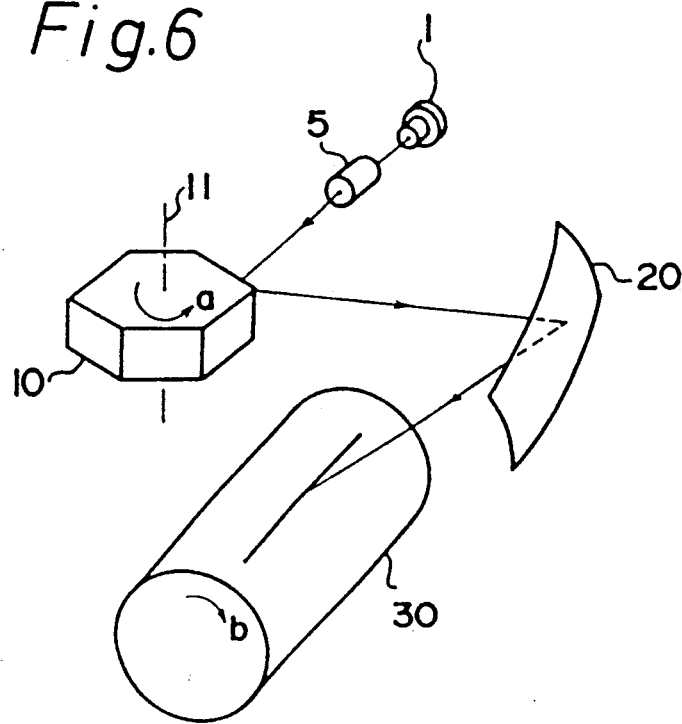
FIG. 6 is a perspective view illustrating a schematic construction of a second embodiment of the present invention.

FIG. 6 illustrates a schematic construction of a second embodiment of the present invention. In this embodiment, a beam splitting device 15 used in the first embodiment is excluded, and a spherical mirror 20 is properly inclined so as not to have incident light overlap reflected light. The light amount, therefore, diminishes less than the case when the beam splitting device 15 is used.

Figure 7:
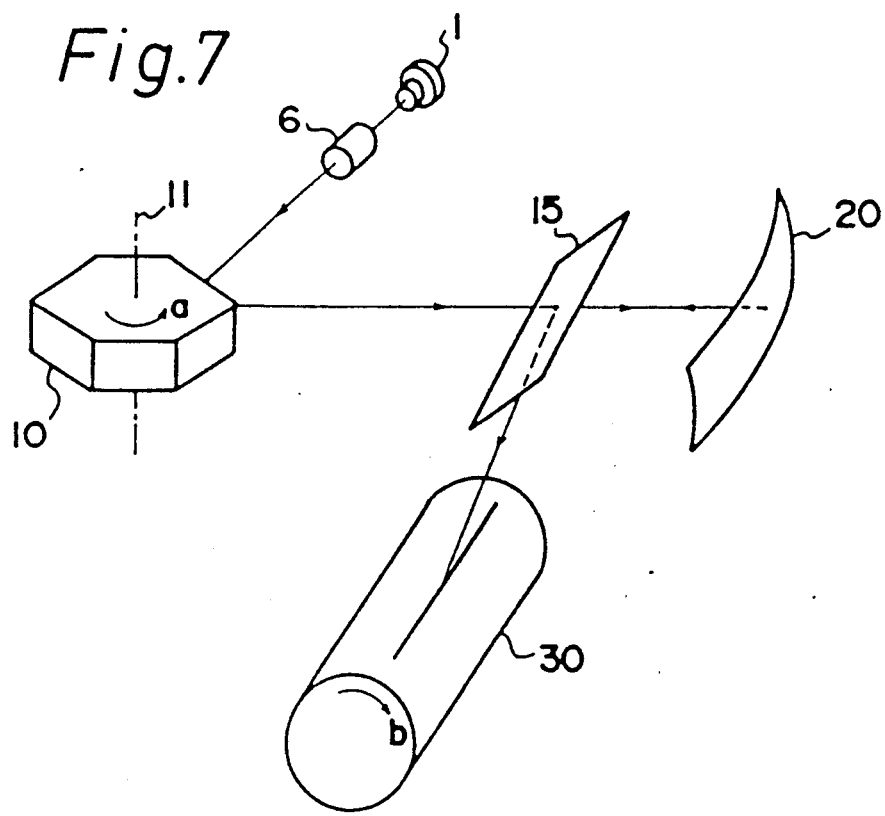
Figure 8A:
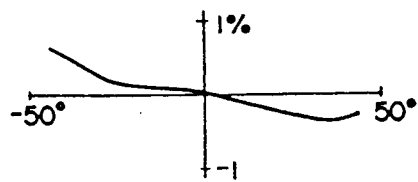
Figure 8B:
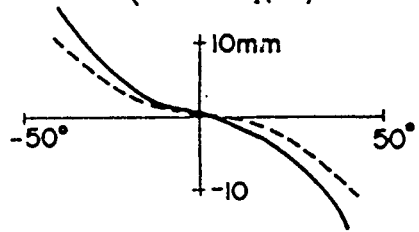
Figure 9A:
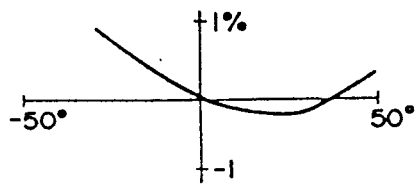
Figure 9B:
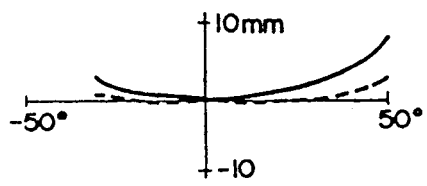
Figure 10A:
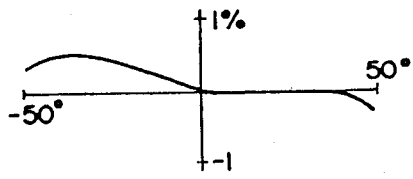
Figure 10B:
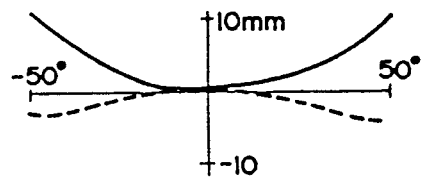
Figure 11A:
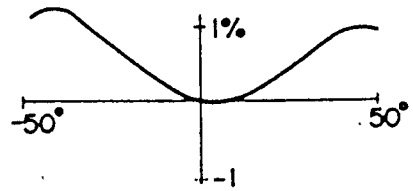
Figure 11B:
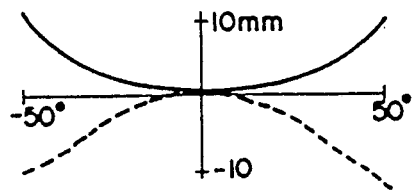

FIG. 7 shows a schematic construction of a third embodiment of the present invention. In this embodiment, the emitting luminous flux from a semiconductor laser 1 is rectified to a converged luminous flux by a collimator lens 6, which is the only difference from the first embodiment. The curve on the light collecting point (image forming plane) of the photoconductor 30 is thus rectified.

In other words, when a converged luminous flux enters a polygon mirror 10 (the same as those of other rotative deflection devices), the light collecting point at the polygon mirror 10 after reflection becomes almost a circular arc centering on the point of reflection and forms a curvature of the field provided that there is no optical member behind the polygon mirror 10. The curve is concave in the direction of incident light. The distance between a spherical mirror 20 and the image plane is changed according to the state of convergence of the incident light. The curvature of the field is also changed by the change in distance. Practically, the curve of a concave plane of the spherical mirror 20 is rectified by the curvature of the field made by the converged luminous flux resulting in making the curvature of the field at the light collecting plane smaller and improving the level of the image plane.

When the curvature of the field becomes smaller, the variation in the diameter of converged luminous flux caused by the difference in the scanning position (image height) becomes smaller, and the optical system can be utilized in wider angles and a dense image can be densely produced since the diameter of the light collecting luminous flux becomes smaller.

In addition to the relationship between the distance d from a reflection point of luminous flux (hereinafter called point of deflection)10a directed toward the center of scanning area by the polygon mirror 10 to the vertex(20a) of the spherical mirror 20 and the radius of curvature ($R_M$) of the spherical mirror 20, the relationship between the radius of curvature ($R_M$) and the distance s (not illustrated) from the point of deflection(10a) to the light collecting point after reflection at the polygon mirror 10 are set to fulfill the following equations.

$$(|s/R_M|) > 0.6 \quad (1)$$

$$0.2 < (d/|R_M|) < 0.6 \quad (2)$$

When the above equations (1) and (2) are fulfilled, satisfactory distortional characteristics as well as a level of an image plane can be obtained over a wide range of angles.

The minimum and maximum values in each one of the above equations are set within the experientially permissible range of image distortion on the photoconductor 30.

If the value exceeds the minimum limit in the equation (1), the image plane approaches the spherical mirror 20 and it makes it difficult to properly dispose the mirror 20 and the distortional characteristics become worse. If the distance s became unnecessarily long, the correction of curvature of the field by utilizing the converged luminous flux becomes hard to function properly.

On the other hand, if the value exceeds the minimum limit in the equation (2), positive distortion is increased according to the increment of the angle of deflection to result in the elongation of image at both edges in the main scanning direction (in the neighborhood of scan starting and scan ending positions). If the value exceeds the maximum limit, negative distortion is increased according to the increment of the angle of deflection to result in the shrinkage of image the at both edges in the main scanning direction and the curvature of the field further becomes larger.

The constructional data in the experimental examples IV, V, VI and VII of the present embodiment will be shown below, wherein the diameter of inscribed circle of the polygon mirror 10 is set at 23.5 mm.

|  | Experimental Example | | | |
| --- | --- | --- | --- | --- |
|  | IV | V | VI | VII |
| Radius of Curvature of Spherical Mirror ($R_M$) mm | −200 | −200 | −200 | −200 |
| Distance (s) mm from Point of Deflection to Light Collecting Point after reflection of Polygon Mirror | 350 | 160 | 270 | 350 |
| Distance (d) mm from Point of Deflection to Spherical Mirror | 100 | 70 | 55 | 45 |
| Distance (d') mm from Spherical Mirror to Photoconductor | 71 | 47.5 | 68 | 75 |
| $|s/R_M|$ | 1.75 | 0.8 | 1.35 | 1.75 |
| $d/|R_M|$ | 0.5 | 0.35 | 0.275 | 0.225 |

The aberrations at the light collecting surface of the photoconductor in each one of the above experimental examples IV, V, VI and VII are shown in FIGS. 8 through 11.

In the figures (a), angle of deflection is shown by horizontal axis and degree of distortion by vertical axis, while in the figures (b), angle of deflection is shown by horizontal axis and degree of curvature by vertical axis. A dotted line shows a curvature of the field by a luminous flux in a deflected plane and a solid line shows a curvature of the field by a luminous flux in the vertical plane against the deflected plane.

Practically, by providing a spherical mirror in the light path extending from a deflection device to the surface of a photoconductor in such a manner as to fulfill the above equations (1) and (2), the scanning speed in the main scanning direction can be uniformly rectified, and satisfactory distortional characteristics as well as a satisfactory level on the image plane can be obtained over a wide range of angles at the light collecting plane. By entering the emitting luminous flux radiated from a light source into a deflection device upon rectifying it to a converged luminous flux, the correction of curvature at the light collecting point by utilizing the spherical mirror can be accomplished. Further, by utilizing the spherical mirror, it shows various advantages as mentioned in the first embodiment of the present invention.

Figure 12:
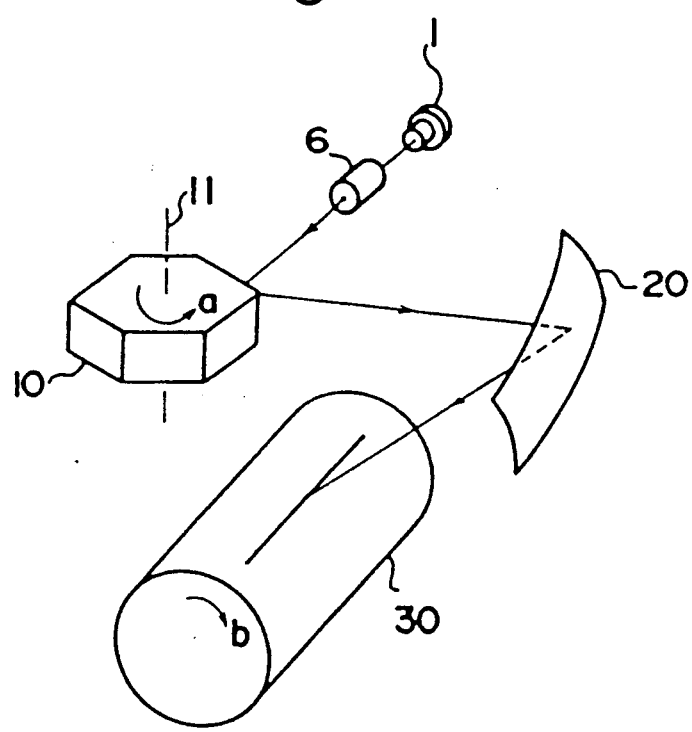
FIG. 12 is a perspective view illustrating a schematic construction of a fourth embodiment of the present invention.

FIG. 12 shows a schematic construction of a fourth embodiment of the present invention. In this embodiment, the beam splitting device 15 used in the third embodiment is excluded, and a spherical mirror 20 is properly inclined so as not to have incident light overlap reflected light. The light amount, therefore, diminishes less than the case when the beam splitting device 15 is used.

The light beam scanning optical system related to the present invention is not limited to each one of the embodiments described above, and various changes and modifications within the scope of the principles may be employed.

For instance, the polygon mirror 10 utilized in the embodiments as a deflection device may be replaced with various other means if it is capable of scanning a luminous flux at an equiangular velocity on a plane. Besides the semiconductor laser, other laser emitting means or a spot light source may be utilized as a light source.

In the above embodiments, shifting of the spherical mirror to the main scanning direction is not referred to. However, in consideration of ease in aberration correction and its positioning, it can be shifted to the main scanning direction. For instance, when the distortional aberration is not symmetrical as in the experimental example IV of the third embodiment (refer to FIG. 8), the distortional aberration can be further reduced by shifting the spherical mirror as described.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A light beam scanning optical system comprising:
   a light source for emitting an intensity modulated luminous flux;
   a collimating means for rectifying an emitted luminous flux from the light source to a parallel luminous flux;
   a deflection device for deflecting the parallel luminous flux from the light source at an equiangular velocity; and
   a spherical mirror for turning and collecting the luminous flux deflected by the deflection device onto the surface of a photoconductor, wherein the deflection device and the spherical mirror fulfill the following equation in order to provide the light beam scanning optical system with $f\theta$ characteristic, $$0.15 < (d/|R_M|) < 0.45$$

wherein d is the distance from a reflection point of a luminous flux directed toward the center of the scanning area by the deflection device to the vertex of the spherical mirror, and $R_M$ is a radius of curvature of the spherical mirror.

2. A light beam scanning optical system as defined in claim 1, wherein the spherical mirror directly receives a luminous flux from the deflection device and directs it toward the surface of photoconductor directly.

3. A light beam scanning optical system as defined in claim 2, wherein the spherical mirror is arranged not to have incident light overlap reflected light.

4. A light beam scanning optical system, comprising:
   a light source for emitting an intensity modulated luminous flux;
   a converging means for rectifying an emitted luminous flux from the light source to a converged luminous flux;
   a deflection device for deflecting the converged luminous flux which has passed through the converging means at an equiangular velocity; and
   a spherical mirror for reflecting and collecting the luminous flux from the deflection device onto the surface of the photoconductor, wherein the deflection device and the spherical mirror fulfill the following two equations, $$(|s/R_M|) > 0.6$$

$$0.2 < (d/|R_M|) < 0.6$$

wherein s is the distance from a reflection point of a luminous flux directed toward the center of the scanning area by the deflection device to the light collecting point after reflection of the deflection device, d is the distance from the reflection point of a luminous flux directed toward the center of a scanning area by the deflection device to the vertex of the spherical mirror, and $R_M$ is a radius of curvature of the spherical mirror.

5. A light beam scanning optical system as defined in claim 4, wherein the spherical mirror directly receives a luminous flux from the deflection device and directs it toward the surface of photoconductor directly.

6. A light beam scanning optical system as defined in claim 5, wherein the spherical mirror is arranged not to have incident light overlap reflected light.

7. A light beam scanning optical system as defined in claim 5, wherein the spherical mirror is shifted to the main scanning direction of the deflection device.

* * * * *